United States Patent [19]
Baker

[11] Patent Number: 6,105,467
[45] Date of Patent: Aug. 22, 2000

[54] METHOD FOR PREPARING A CUTTING EDGE ON AN END MILL

[76] Inventor: David A. Baker, 1455 Foxridge Cir., Auburn, Calif. 95603

[21] Appl. No.: 09/105,314

[22] Filed: Jun. 26, 1998

[51] Int. Cl.[7] .................................................... B21K 5/04
[52] U.S. Cl. ........................... 76/104.1; 76/108.6; 451/48
[58] Field of Search ....................... 451/59, 48; 76/104.1, 76/108.6, 108.1

[56] References Cited

U.S. PATENT DOCUMENTS

| | | |
|---|---|---|
| 3,874,900 | 4/1975 | Post et al. . |
| 3,988,955 | 11/1976 | Engel et al. . |
| 4,470,895 | 9/1984 | Coad et al. . |
| 4,945,640 | 8/1990 | Garg et al. . |
| 5,467,670 | 11/1995 | Alverio . |
| 5,477,616 | 12/1995 | Williams et al. . |
| 5,575,704 | 11/1996 | Hotani .................................. 451/59 X |
| 5,709,587 | 1/1998 | Shaffer .............................. 76/108.6 X |

FOREIGN PATENT DOCUMENTS

| | | |
|---|---|---|
| 42029 | 4/1976 | Japan . |
| 42030 | 4/1976 | Japan . |
| 120937 | 9/1980 | Japan . |
| 131173 | 10/1980 | Japan . |
| 144937 | 11/1980 | Japan . |
| 3152 | 1/1981 | Japan . |

*Primary Examiner*—Douglas Watts
*Attorney, Agent, or Firm*—James M. Ritchey

[57] ABSTRACT

A method of increasing the length of time a tool maintains sharp cutting edges utilizes the steps of manufacturing the tool with the cutting edges ground sharp and then partially dulling, to a lighter or heavier extent, those previously ground sharp cutting edges. Often the partial dulling is accomplished by means of applying a brush wheel to the selected cutting edges.

8 Claims, 3 Drawing Sheets

METHOD FOR PREPARING A CUTTING EDGE ON AN END MILL

BACKGROUND OF THE INVENTION

1. Field of the Invention

A method for generating a wear resistant cutting edge on an end mill. In particular, the subject invention discloses a procedure for producing a wear resistant cutting edge on an end mill by grinding the cutting edges, radial and axial, ground up sharp and then, prior to a applying a physical vapor deposition (PVD) coating of protective material, the edges are honed or partially dulled. The partial dulling can be lighter or heavier, depending upon the exact materials utilized to fabricate the cutting tool and the material to be cut.

2. Description of the Background Art

Rotational end mills have been utilized for various cutting chores and have a long history. Various sharpening methods have been developed over the years. Many of the more successful sharpening processes involve the deposition of surface materials onto the end mills for strengthening the final cutting edges. When a traditionally sharpened end mill rotationally encounters hard substances such as stainless steels and related, similar, or equivalent nickel alloys, with or without other added elements, the cutting edges begins to chip as the cutting process occurs. As cutting continues the edges begin to dull. Frequently, chips from the cutting edge he end mill will adhere or stick, via generated heat interactions, to the dulling cutting edge and further roughen the edge for the next cutting rotation. Among the negative consequences associated with this traditional edge destruction or degradative process are a decreased life of the end mill, increased costs for the milling operation, and cuts into the milled materials that are less precise than may be desired or required for a particular final function.

Specifically, U.S. Pat. No. 5,467,670 discloses a chemical vapor deposition (CVD) process for attempting to keep the edges of rotary cutting tools sharp. The high temperatures in this process cause a chemical reaction to occur on the surface of the cutting tool. Generally, the process involves final grinding on all surfaces except the flank faces. All of the surfaces of the tool are then wear coated with a CVD process at a high enough temperature to embrittle the sharp, rough ground cutting edges. The flank faces are then ground to specification sharpness, thereby removing the embrittled layer on the flank faces while leaving the rake faces CVD coated. If desired, a final PVD wear layer coating may then be applied.

Disclosed in U.S. Pat. No. 4,945,640 is a wear resistant coating for sharp-edged tools and the like. Usually, a base layer of noble metal is formed on the surface followed by an intermediate layer of tungsten and a final coating of a mixture of tungsten and tungsten carbide.

U.S. Pat. Nos. 3,874,900 and 3,988,955 both relate methods for coating wear surfaces with vapor deposits.

U.S. Pat. No. 4,470,895 presents an ion plating method for depositing a coating. The method stop the application of the coating immediately next to where the cutting edge begins so as to leave the cutting edge not covered.

In U.S. Pat. No. 5,477,616 the body of a knife blades is coated with a hard material in such a manner as to permit the entire cutting edge to be formed from the harder material.

Six patent from Japan (Nos. 51-42,029; 51-42030; 55-120937; 55-131173; 55-144937; and 56-3152) illustrate the use of various compositions of hardening material on the surfaces of cutting implements.

The foregoing patents reflect the state of the art of which the applicant is aware and are tendered with the view toward discharging applicant's acknowledged duty of candor in disclosing information which may be pertinent in the examination of this application. It is respectfully submitted, however, that none of these patents teach or render obvious, singly or when considered in combination, applicant's claimed invention.

SUMMARY OF THE INVENTION

An object of the present invention is to provide a method for sharpening the cutting edges of a tool to produce sharpened edges that resist wear more efficiently than currently sharpened edges.

Another object of the present invention is to furnish a method for sharpening the cutting edges of a solid carbide end mill to create cutting edges that are resistant to chipping and dulling during machining of stainless steels and related alloys.

A further object of the present invention is to supply a simple method of producing wear resistant cutting edges on an end mill by first grinding sharp the relevant edges and then partially dulling those edges before a PVD coating is applied.

Still another object of the present invention is to disclose a method to reduce chipping of the cutting edges on a solid carbide end mill by first grinding sharp the relevant edges, then honing to a slightly or partially dulled form those previously sharpened edges, and then applying a final PVD coating to the end mill.

Disclosed is a method of increasing the length of time a tool (usually an end mill or the like) maintains sharp cutting edges. Generally, the subject method comprising the steps of obtaining the tool with non-sharpened or worn cutting edges and grinding sharp the previously non-sharpened or worn cutting edges. Next, the selected cutting edges that were previously ground sharp are partially dulled. Lastly, a PVD coating is applied to desired areas of the tool. Preferably, the partial dulling is accomplished by applying a silicon carbide impregnated brush wheel to said selected cutting edges, but hand honing or the like is acceptable. With use of the brush, the partial dulling often comprises rotating the tool with the ground sharp cutting edges in a first direction and applying a silicon carbide impregnated brush wheel to the selected cutting edges with the brush wheel rotating in a second direction. Depending on the exact nature of either the material from which the tool is fabricated or the material that is to be machined, the application of the subject process may be lighter or heavier to increase the extent of dulling for the previously ground sharp edges.

Other objects, advantages, and novel features of the present invention will become apparent from the detailed description that follows, when considered in conjunction with the associated drawings.

DESCRIPTION OF THE PREFERRED EMBODIMENT

A preferred embodiment of the subject method comprises a method for prolonging the useful life of a cutting edge on a tool. The longer useful life is the result of producing edges that resist degradation by chipping. Additionally, the subject edges that resist chipping improve the overall surface finish of the machined parts. Preferably, the tool is a rotational end mill, or the equivalent, having various types of cutting edges. Usually, at least both axial and radial cutting edges exist on end mills. Many end mills are fabricated from various commercial grades of solid carbide and are designed to machine hard stainless steels and related alloys, often having a significant nickel content.

Figure 1A:
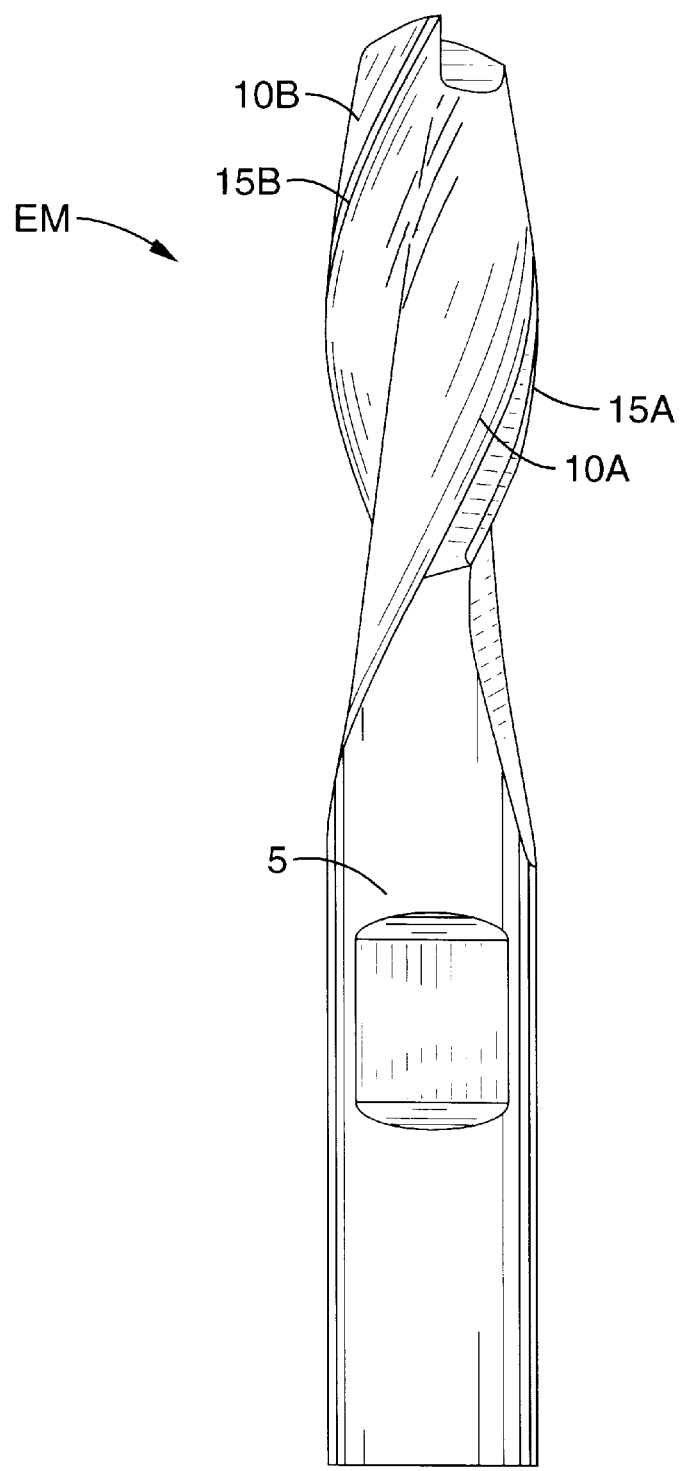
FIG. 1A is a side view of an end mill cutting device.
Figure 1B:
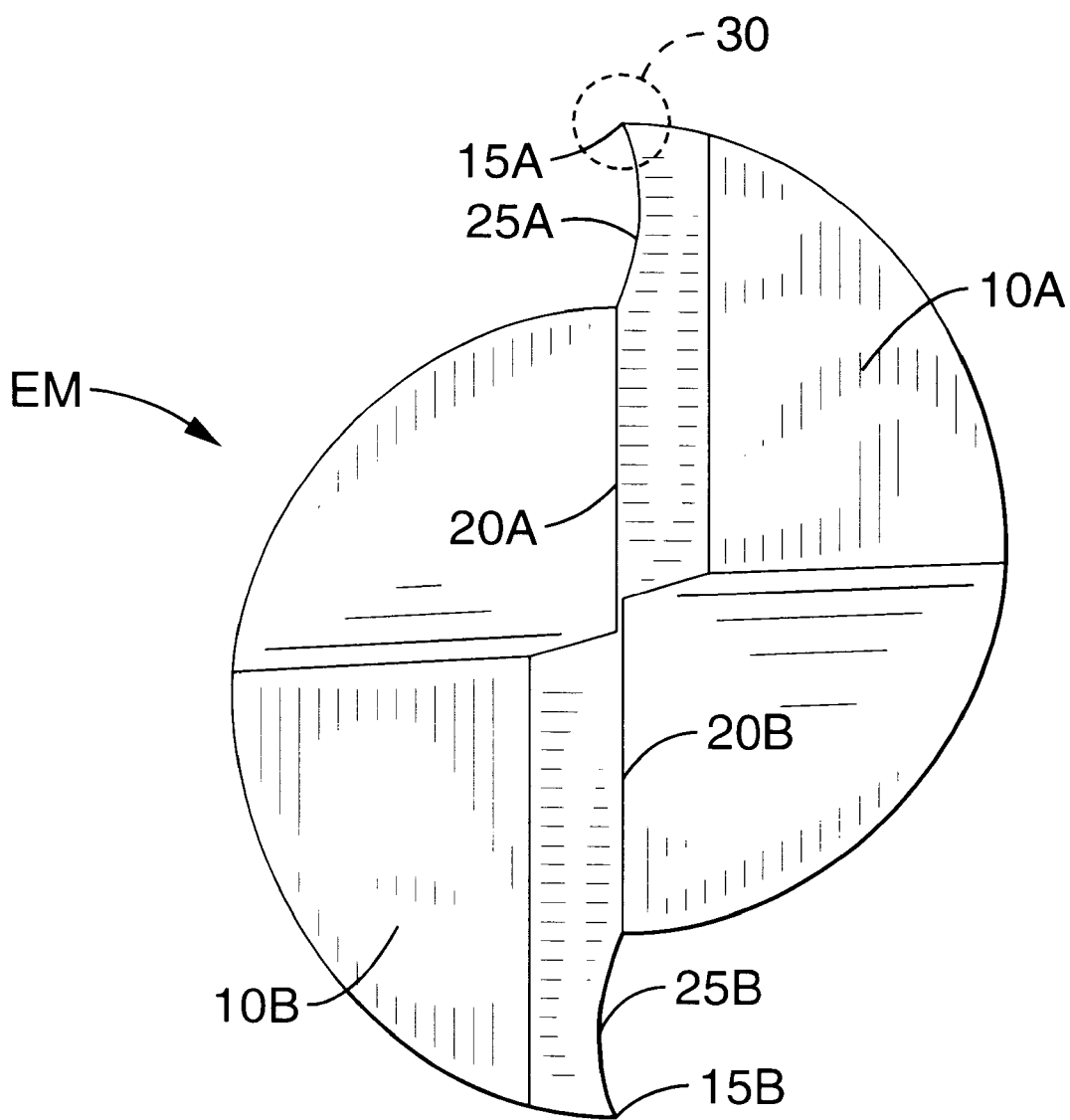
FIG. 1B is an end view of an end mill cutting device.

For exemplary purposes only and not by way of limitation, FIG. 1A shows a side view of a typical end mill EM having a shank 5 and two opposing flutes 10A and 10B that spiral down from the cutting tip to the shank 5. Each end mill EM is formed from a suitably sized cylinder of metal. Usually, the metal of choice from which to form an end mill EM is carbide steel or its equivalent. Although this exemplary end mill EM has only two flutes 10A and 10B, end mills with three, four, or more flutes are contemplated to be within the realm and this disclosure and would serve just as satisfactorily with the subject method as the two flute version depicted in FIG. 1A (and 1B). Following along each flute's 10A and 10B outer boundary is a spiraling cutting edge 15A and 15B, respectively. FIG. 1B shows the cutting tip of the end mill EM. The flutes 10A and 10B terminate in cutting edges 20A and 20B at the cutting tip of the end mill EM. Often, a rake regions 25A and 25B are formed in each flute 20A and 20B, respectively. Although the rake regions 25A and 25B are illustrated in FIG. 1B, other types of end mills EM without the rake regions 25A and 25B may be utilized with the subject method. The cutting edges of the end mill EM may be finished to a generally smooth cutting edge, a serrated cutting edge with peaks and valleys, or any suitable profile cutting edge.

Figure 3:
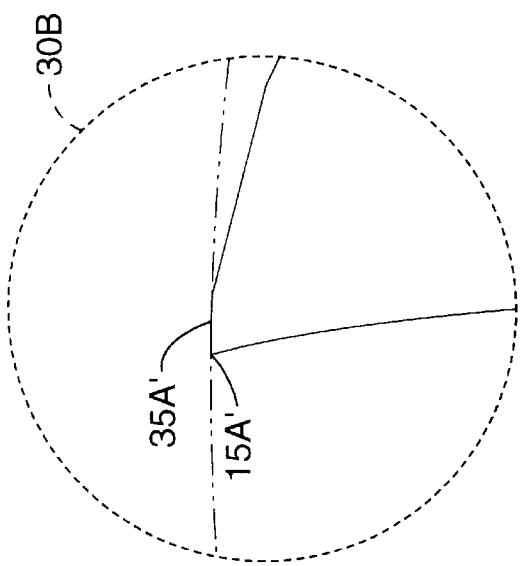
FIG. 3 is an enlarged end view of a cutting edge on an end mill that retains some of the cylindrical margin to decrease chipping and was produced by a PRIOR ART method.
Figure 4:
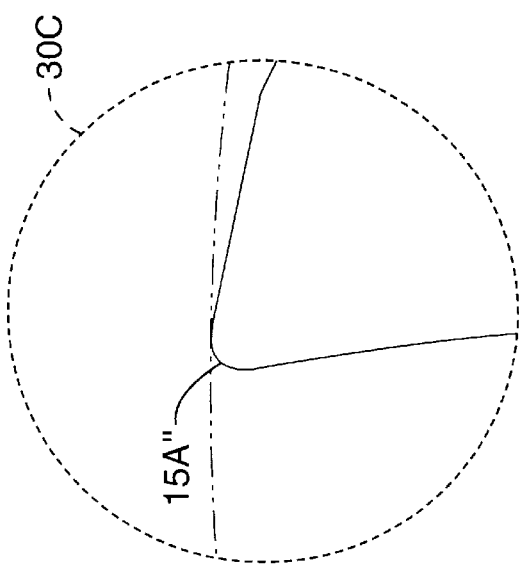
FIG. 4 is an enlarged end view of the subject cutting edge on an end mill, whereby the subject cutting edge was produced by the subject method to minimize chipping.
Figure 2:
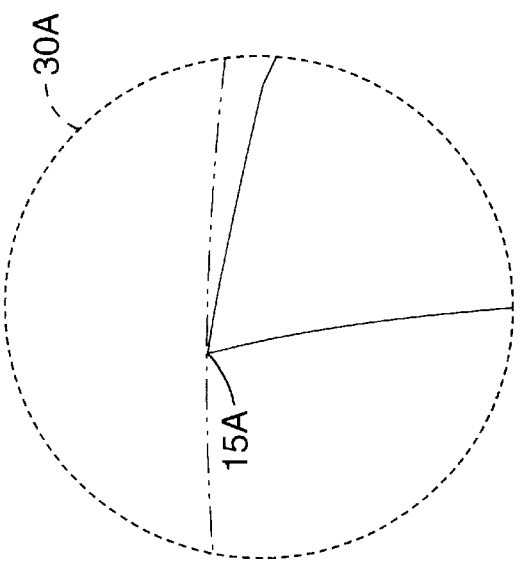
FIG. 2 is an enlarged end view of a traditional cutting edge on an end mill that was produced by a PRIOR ART method.

FIGS. 2–4 are utilized to more effectively demonstrate the difference between the much less useful prior art sharpening methods and the subject invention. The dashed region denoted as number 30 in FIG. 1B is enlarged in FIGS. 2–4 as 30A, 30B, and 30C, respectively. FIGS. 2–3 illustrate the state of the art for a cutting edge before the subject invention, while FIG. 4 depicts the result of applying the subject method to a selected cutting edge. FIG. 2 shows in enlargement 30A a cutting edge 15A honed to be sharp. Specifically, FIG. 2 shows the radial relief surface as it is usually made on end mills, that is, ground up to a sharp point. This is the traditional way in which edges were sharpened, but this procedure resulted in frequent chipping of the edge 15A during usage in milling procedures. FIG. 3 shows in enlargement 30B a cutting edge 15A' that maintains a small portion of the cylindrical margin 35A'. Specifically, FIG. 3 shows the radial relief surface as it is usually made on end mills where a cylindrical margin 35A' is desired, not ground sharp, but ground only to the point where a cylindrical margin 35A' remains. By retaining a small portion of the cylindrical margin 35A' of the original cylindrical body from which the end mill was ground, it was hoped that chipping would be decreased.

Compared to a traditional ground sharp edge (see FIG. 2) or the cylindrical margin edge (see FIG. 3) methods, the subject method (shown in the FIG. 4 enlargement 30C) produces an edge 15A" that is lightly dulled or honed. Such a lightly dulled edge 15A" significantly resists chipping more efficiently (thereby prolonging its useful life span) than the traditional ground sharp edge 15A or cylindrical margin edge 15A'.

Although various honing techniques may be employed to dull the cutting edges, generally, a solid carbide end mill specifically designed for machining stainless steel or similar type materials has the subject cutting edges prepared using a silicon carbide impregnated brush wheel. The end mill is manufactured using conventional grinding technology, with the cutting edges, radial and axial, ground up sharp. As a penultimate operation (immediately prior to PVD coating with TiCN or TiAlN), the edges are honed or lightly dulled using a silicon carbide brush wheel mounted on a cylindrical grinder. Usually, the silicon carbide brush wheel is about 500 grit but may vary to lesser or greater grit values and still be within the realm of this disclosure. Generally, although alternative equivalent procedures are contemplated, the end mill is held in a collet chuck and rotated against the brush wheel in the normal cutting direction with a specific amount of pressure (as measured in thousandths of an inch increments) required to achieve a measurable land width which varies with tool diameter. By varying the attack position and angles, the edge preparation may be applied to both the axial and radial cutting edges, thus allowing the tool to machine various nickel based and other high temperature alloys without chipping in peripheral, slotting, pocketing, or plunging cuts.

More specifically, in order to apply the subject edge, the following equipment may be utilized:

1) Machinery: A standard cylindrical universal grinder with a live workhead and collet holding taper in the workhead is used in the subject method. Suitable machines would include, but not be limited to:
   a) Myford MG-12 or Myford MG-12H;
   b) Studer RHU 500, Studer S-20, or Studer S-30; and
   c) almost any other similar cylindrical universal grinder.
2) Brush Wheel: A silicon carbide impregnated brush wheel is mounted on the grinding spindle head of the cylindrical grinder and rotated in the traditional, standard direction (top coming down) so that it contacts the end mill being held in the collet and rotated in the traditional, standard direction (top coming down). Suitable wheels would include:
   a) Brush Research Manufacturing Co. Model No. NY12-500SC;
   b) Brush Research Manufacturing Co. Model No. NY14-500SC; and
   c) Weiler Brush Co. Model No. 84710 Nylox Wheel.

With a combination of the above machine and brush wheel, the end mill, held in the workhead collet and rotated upward (in the cutting direction) against the brush wheel, rotating downward results in a honing of both the radial rake face and the radial relief surface. One difference between the subject process and traditional edge preparation honing processes is that with the subject process the radial rake face is honed at the same time and to the same degree of edge preparation as the radial relief surface.

The slightly dulled are then subjected to a standard PVD coating with TiCN or TiAlN or left in an uncoated state, as desired.

Clearly, the subject invention may be applied to worn cutting tools in addition to newly made tools. With old worn tools, if salvageable, the worn edges may be ground sharp and then partially dulled by the above described technique.

EXPERIMENTAL

Several tests have been conducted to verify that the subject method produces end mills that have reduced chipping and therefore enhanced life-times.

Experiment #1

Three test end mills (from RobbJack Corporation, 3300 Nicolaus Road, Lincoln, Calif. 95648) were fabricated from Sandvik H10F carbide steel. Two tools had traditional ground sharp edges and the third had the subject method applied to slightly dull the previously ground shape edges. All three tools were used to cut identical grooves in a selected stainless steel material. The third tool had less than half the amount of chipping noted for the other non-treated tools.

Experiment #2

Tungsten copper was machined by four different tools (each tool was a T6-200-04 "Tuffy" solid carbide stub/standard end mill from RobbJack Corporation, 3300 Nicolaus Road, Lincoln, Calif. 95648). Tool #1 had cutting edges that were prepared in the traditional manner by being ground sharp. Tool #2 had a light (minimal silicon brush wheel honing of previously ground sharp edges) application of the subject process. Tool #3 had a heavy (prolonged silicon brush wheel honing of previously ground sharp edges) application of the subject process. Tool #4 had the subject method applied, but by a hand honing (by a suitable brush of the like) procedure in place of the silicon brush wheel. Each tool was used in identical machine procedures (identical RPMs, feed rates, cut depth, total linear inches, and the like) to cut a slot in a tungsten copper sample. The results are shown in Table 1 below.

TABLE 1

Chipping Tests of Cutting Tools Cutting a Tungsten Copper Alloy

| Tool Number | Process | Results |
|---|---|---|
| 1 | Traditional Ground Sharp | Good finish with no burrs and some chipping. |
| 2 | Light Subject Process Applied by Brush Wheel | Small burr on top edge of slot, but no chipping. |
| 3 | Heavy Subject Process Applied by Brush Wheel | Burr on top edge of slot, but no chipping. |
| 4 | Subject Process Applied by Hand Honing | Very small burr on top edge of slot, but no chipping. |

Clearly, the subject process, whether by hand or brush wheel or in a heavy application or a light application, yielded tools that did not chip during usage.

Experiment #3

As seen in Tables 2 and 3, two types of materials were utilized to fabricate end mills (all of the tools were STR 301-12 type end mills with serrated (roughing) cutting edges from RobbJack Corporation, 3300 Nicolaus Road, Lincoln, Calif. 95648) which were process by the traditional ground sharp method or by light or heavy application of the subject method. Plainly, the subject method, overall, minimized chipping of the treated tools. Light and heavy application of the subject method differ only by amount of overall dulling of the previously ground sharp cutting edges. For example, if the cutting edges were serrated, a light application of the subject process would only partially dull the peaks, whereas a heavy application of the subject process would partially dull both the peaks and valleys.

TABLE 2

Chipping Tests on Cutting Tools Cutting 4140 Stainless Steel[1]

| Tool No. | Coating | Process | Material for Tool | Inches Per Minute (IPM) | Linear Inches | Cubic Inches | Results |
|---|---|---|---|---|---|---|---|
| 1 | TiCN | Traditional | Mitsubishi TF15 Carbide | 18 | 10.1 | 1.72 | Bad Chipping |
| 2 | TiN | Traditional | Mitsubishi TF15 Carbide | 18 | 10.1 | 1.72 | Bad Chipping |
| 3 | TiN | Traditional | Sandvik H10F Carbide | 18 | 10.1 | 1.72 | Bad Chipping |
| 4 | TiCN | Traditional | Mitsubishi TF15 Carbide | 9 | 10.1 | 1.72 | Bad Chipping |
| 5 | TiN | Traditional | Mitsubishi TF15 Carbide | 9 | 10.1 | 1.72 | Bad Chipping |
| 6 | TiCN | Subject Process Applied by Hand | Mitsubishi TF15 Carbide | 9 | 10.1 | 1.72 | No Chipping |
| 7 | TiN | Subject Process Applied by Brush Wheel on End Only | Mitsubishi TF15 Carbide | 9 | 10.1 | 1.72 | Bad Chipping |
| 8 | TiN | Heavy | Sandvik | 9 | 151.5 | 25.85 | Small Chipping |

TABLE 2-continued

Chipping Tests on Cutting Tools Cutting 4140 Stainless Steel[1]

| Tool No. | Coating | Process | Material for Tool | Inches Per Minute (IPM) | Linear Inches | Cubic Inches | Results |
|---|---|---|---|---|---|---|---|
| | | Subject Process Applied by Brush Wheel | H10F Carbide | | | | |
| 9 | TiN | Heavy Subject Process Applied by Brush Wheel | Sandvik H10F Carbide | 9 | 20.2 | 3.44 | Small Chipping |

[1]All tools were run at 150 SFM (surface feet per minute) in which a slot was cut that was 0.375 inches wide and 0.455 inches deep.

TABLE 3

Chipping Tests on Cutting Tools Cutting 316 Stainless Steel[2]

| Tool No. | Coating | Process | Material for Tool | IPM | Linear Inches | Cubic Inches | Results |
|---|---|---|---|---|---|---|---|
| 10 | TiN | Standard | Sandvik H10F Carbide | 9.1 | 90 | 4.05 | A few chips. |
| 11 | TiN | Heavy Subject Process Applied by Brush Wheel | Sandvik H10F Carbide | 9.1 | 90 | 4.05 | No chips. |
| 12 | TiN | Light Subject Process Applied by Brush Wheel | Sandvik H10F Carbide | 9.1 | 90 | 4.05 | A few chips. |

[2]All tools were run at 200 SFM (surface feet per minute) in which a slot was cut that was 0.375 inches wide and 0.455 inches deep.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A method of increasing the length of time a tool maintains sharp cutting edges, comprising the steps of:
   a) manufacturing the tool with the cutting edges ground sharp and
   b) applying a brush wheel at variable angles and attack positions to dull selected cutting edges that were previously ground sharp.

2. A method according to claim 1, wherein said dulling further comprises the steps:
   a) rotating said tool with said ground sharp cutting edges in a first direction and
   b) applying said brush wheel to said selected cutting edges, wherein said brush wheel rotates in a second direction.

3. A method of increasing the length of time a rotational end mill maintains sharp cutting edges, comprising the steps of:
   a) obtaining the rotational end mill with the cutting edges ground sharp
   b) applying a silicon carbide impregnated brush wheel at variable angles and attack positions to dull selected cutting edges that were previously ground sharp; and
   c) applying a PVD coating to said rotational end mill.

4. A method according to claim 3, wherein said partial dulling further comprises the steps:
   a) rotating said rotational end mill with said ground sharp cutting edges in a first direction and
   b) applying said silicon carbide impregnated brush wheel to said selected cutting edges, wherein said silicon carbide impregnated brush wheel rotates in a second direction.

5. A method according to claim 4, wherein said application of said rotating silicon carbide impregnated brush wheel to said rotating end mill at said variable angles and attack positions dulls desired axial and radial cutting edges on said rotational end mill.

6. A method of increasing the length of time a solid carbide rotational end mill maintains sharp cutting edges, comprising the steps of:
   a) obtaining the solid carbide rotational end mill with non-sharpened or worn cutting edges;
   b) grinding sharp said previously non-sharpened or worn cutting edges;

c) applying a silicon carbide impregnated brush wheel at variable angles and attack positions to dull selected cutting edges that were previously ground sharp; and d) applying a PVD coating to desired areas of the solid carbide rotational end mill.

7. A method according to claim 6, wherein said partial dulling further comprises the steps:

a) rotating said tool with said ground sharp cutting edges in a first direction and b) applying said silicon carbide impregnated brush wheel to said selected cutting edges, wherein said silicon carbide impregnated brush wheel rotates in a second direction.

8. A method of sharpening an end mill, comprising steps:

a) obtaining the end mill with non-sharpened or worn cutting edges;

b) grinding sharp said non-sharpened or worn cutting edges producing ground sharp cutting edges; and c) dulling partially said ground sharp cutting edges by:

i) rotating said end mill with said ground sharp cutting edges in a first direction and ii) applying a brush wheel to selected ground sharp cutting edges, wherein said brush wheel rotates in a second direction thereby dulling said selected ground sharp cutting edges, wherein said application of said rotating brush wheel to said rotating end mill occurs at variable angles and attack positions to dull desired axial and radial cutting edges on said rotational end mill.

* * * * *